Feb. 1, 1938.  F. S. SMITH  2,107,132
CONDENSER CONSTRUCTION
Original Filed Nov. 25, 1931    6 Sheets—Sheet 1

Feb. 1, 1938. F. S. SMITH 2,107,132
CONDENSER CONSTRUCTION
Original Filed Nov. 25, 1931 6 Sheets-Sheet 2

Franklin S. Smith
INVENTOR
BY Janney, Blair & Curtis
ATTORNEYS

Feb. 1, 1938. F. S. SMITH 2,107,132

CONDENSER CONSTRUCTION

Original Filed Nov. 25, 1931 6 Sheets-Sheet 3

Franklin S. Smith
INVENTOR

BY Janney, Blair & Curtis
ATTORNEY

Feb. 1, 1938.   F. S. SMITH   2,107,132
CONDENSER CONSTRUCTION
Original Filed Nov. 25, 1931   6 Sheets-Sheet 4

Feb. 1, 1938. F. S. SMITH 2,107,132
CONDENSER CONSTRUCTION
Original Filed Nov. 25, 1931   6 Sheets-Sheet 6

Franklin S. Smith
INVENTOR

BY his ATTORNEYS
Janney, Blair & Curtis

Patented Feb. 1, 1938

2,107,132

UNITED STATES PATENT OFFICE 2,107,132

CONDENSER CONSTRUCTION

Franklin S. Smith, New Haven, Conn.

Application November 25, 1931, Serial No. 577,295
Renewed November 16, 1936

43 Claims. (Cl. 175—41)

This invention relates to electric condenser construction.

One of the objects of this invention is to provide a simple and thoroughly practical electrical condenser construction that will be of dependable and efficient action in use. Another object is to provide a condenser construction that will be compact, rugged and of high efficiency. Another object is to provide a construction of the above-mentioned nature that will lend itself readily to quantity production, that may be readily and dependably assembled and that will be well adapted to meet the varying conditions of hard practical use. Another object is to provide a condenser that will have high electrical capacity per unit volume. Another object is to provide a construction that may be dependably operated at high voltage and, more particularly, one that will have the characteristics desirable for power factor correction purposes in the alternating current power field. Another object is to provide a condenser construction that will lend itself readily to meet various electrical requirements, such as capacity, and that may be readily arranged to meet varying requirements in single-phase, 2-phase, or 3-phase power circuits.

Another object is to provide a simple, compact and reliable condenser unit and a method of making the same, together with a thoroughly practical method and apparatus for assembling and interconnecting units of this character to meet any of the widely varying requirements of practical use. Other objects will be in part obvious or in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawings, in which is shown a preferred embodiment of the mechanical features of my invention.

Figure 28 is a side elevation of an assembled condenser having, by way of illustration, six condenser units therein, with the container or tank broken away to show the units in side elevation, and illustrating a construction in which separating insulators are entirely dispensed with;

Similar reference characters refer to similar parts throughout the several views of the drawings.

Figure 1:
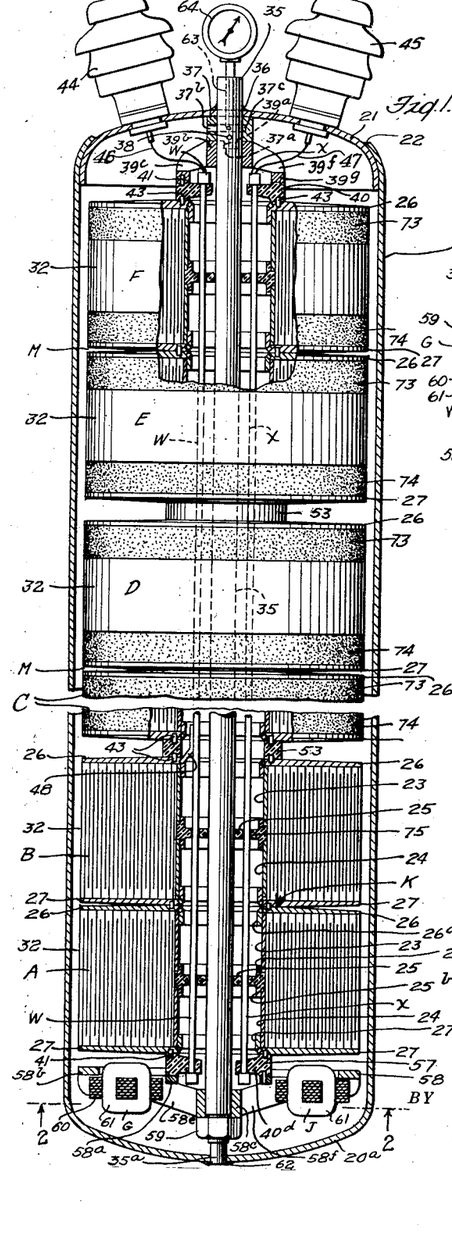
Figure 1 is a central vertical sectional view of an assembled condenser having, by way of illustration, six condenser units therein.

Referring now more particularly to Figure 1, I have shown at 20 a tank or casing of round cross-section, made preferably of pressed steel and adapted to withstand relatively high internal pressures; the tank or container 20 has its upper otherwise open end closed by a pressed steel head 21 welded thereto as at 22 after the assembly of certain parts has taken place, all as will be described in detail hereinafter. Within the tank 20 is contained the condenser construction and also a suitable dielectric which, insofar as certain features of my invention are concerned, preferably takes the form of a gaseous dielectric under relatively high pressure, such as a pressure on the order of fifteen atmospheres.

The condenser is preferably made up in units and in Figure 1, I have illustratively shown the preferred number of units as six; in Figure 1 these six units are the units A, B, C, D, E and F, all of the same construction and electrical capacity. Accordingly, it will suffice to describe in detail the construction of only one of these units.

Figure 4:
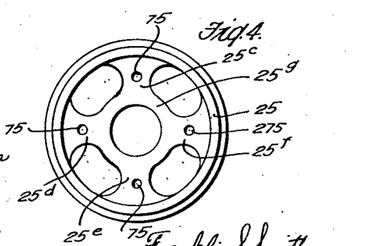
Figure 4 is a plan view on a like enlarged scale showing an insulating part employed in the assembly.
Figure 7:
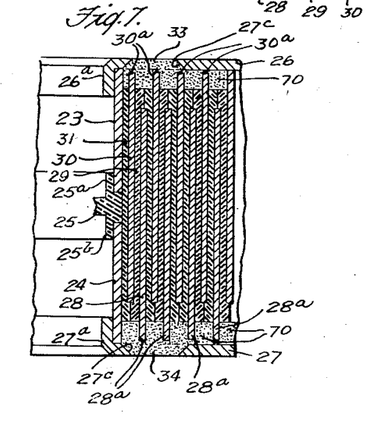
Figure 7 is a fragmentary vertical sectional view on an enlarged scale of a condenser unit, showing in exaggerated form the relation of the condenser elements and of the dielectric therebetween.

Considering now the construction of individual units, reference might first be made to Figure 7 and to the detailed construction of unit A. I first provide two tubular or sleeve-like metal members 23 and 24 made, for example, of aluminum and of the same inside and outside diameters. The tubular members 23 and 24 are then fitted onto the flanges 25$^a$ and 25$^b$, respectively, of a ring-like member 25 of solid dielectric material, such as molded phenolic condensation product or bakelite. Member 25 has its outer periphery suitably shaped or recessed, as is clearly shown in Figure 7, to receive the tube members 23—24 snugly and so as to form with the latter a continuous external cylindrical surface. Ring member 25 is shown in plan in Figure 4 and has other structural features which will be described more clearly hereinafter.

After having assembled parts 23, 25 and 24 as above-described, these parts may be permanently secured together in any suitable manner or may, for carrying out certain subsequent steps, be temporarily held together in any suitable or convenient manner. When thus assembled they form a hub having an external cylindrical surface onto which I wind or wrap the condenser elements, the latter preferably taking the form of metal foil for the plate members and a suitable material, for example paper, as an interposed dielectric.

Figures 5, 6, 9, 10:
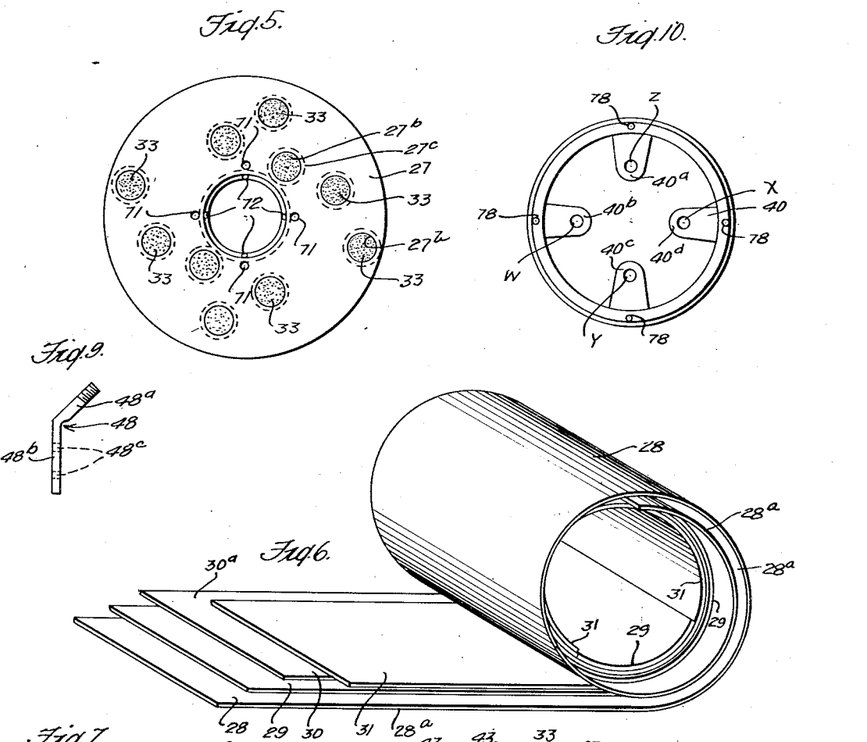
Figure 5 is a plan view on a smaller scale of a member employed in assembling and electrically connecting one of the condenser units.
Figure 6 is a diagrammatic perspective view indicating a preferred form of my method of constructing the condenser unit.
Figure 9 is a side elevation on an enlarged scale of a connector.
Figure 10 is a plan view of an insulating supporting member.

The building up or winding of the condenser unit is achieved by simultaneously winding, about the hub formed by the members 23, 25 and 24, four layers, in strip form, of alternated foil and paper. In Figure 6 is shown in exaggerated diagrammatic perspective the relation of these layers as they are being wound. The conductors or metal foil strips are indicated at 28 and 30, and the dielectric material is indicated at 29 and 31, and from Figure 6 it plainly appears that these layers are alternated. The foil strips are equal in width but of lesser width than the strips of dielectric material. The strips of dielectric are of like width.

The dielectric strips 29 and 31 are alined with each other while the foil strip 28 is displaced laterally so that an edge portion 28$^a$ thereof projects beyond the alined side edges of the paper strips 29 and 31. The foil strip 30 is also laterally displaced but to the other side so that an edge portion 30$^a$ thereof projects beyond the alined edges of the paper strips 29 and 31. The amount that the foil projects is preferably as slight as practicable, for a preferred purpose to be hereinafter dealt with. The lateral but oppositely directed displacements of the foil strips from the alined paper strips are such that the over-all lateral dimension of the superimposed strips is substantially, and preferably exactly, equal to the axial length of the hub members 23, 25 and 24. These relations of the various parts are clearly shown in the enlarged sectional view of Figure 7 in which the foil and paper strips and the projection of the foil beyond the paper are shown in exaggerated form in order that these relations may be more clearly understood.

Any suitable mechanism or apparatus may be utilized to wind the foil and dielectric strips and to hold them in the above-described relation during such winding operation as the assembled supporting structure 23—25—24 is rotated, thus to wind a suitable number of turns of these foil and dielectric strips onto the hub to give the desired electrical capacity. The thickness and kind of foil and the thickness and electrical properties of the dielectric are selected to meet the requirements of the electrical conditions to which they are to be subjected in practice. For example, the foil may be several thousandths of an inch thick and each dielectric strip may comprise several overlapping layers or strips of paper. By way of further example, where I use paper as the interposed solid dielectric, I may employ as many as twenty superimposed strips or layers of paper, interposed between the foil strips. It should therefore be understood that the dielectric strips 29 and 31 of Figures 6 and 7, though indicated therein for the sake of simplicity as comprising each only one thickness, may be made up of as many layers of paper as is necessary. Where I employ paper for the dielectric, I preferably use uncalendered paper to achieve advantages, certain of which are pointed out in detail hereinafter.

The paper strips 29 and 31, before being subjected to the above-described winding process, are vacuum-dried under heat in order to remove any moisture contained therein. I may employ any suitable apparatus for this purpose and I may note that I prefer, in this step of my process, to heat the paper to a temperature of about 100° C. in a suitable chamber, while exhausting the latter and pumping out of it moisture driven off or out of the paper, by any suitable pumping apparatus.

Also, the paper, as it is being wound with the foil as above-described, is hot, being maintained heated, during the winding process, by any suitable means so as to prevent the condensation thereon of moisture from the atmosphere. Thus, I not only initially dry the paper but also make certain that the pre-dried paper does not take on any moisture during the winding operation.

Thereupon, I spray a fused metal onto the tightly compacted and relatively alined and exposed edges of the dielectric members 29 and 31 and upon the slightly projecting edges of the foil members 28 and 30. The spray of fused metal, the latter being preferably aluminum, is directed against and ultimately preferably over the entire areas of the annular or end faces of the condenser unit as thus far completed. The spraying is continued until a coating of fused metal, which solidifies upon cooling, of a thickness on the order of two thousandths of an inch, is achieved and at this point I note that this coating is permeable but, nevertheless, mechanically and electrically unites the spirally related slightly projecting edge portions 30ª (see Figure 6) of the foil member 30 and similarly unites, at the other end face of the unit, the slightly projecting edge portions 28ª of the foil member 28.

The foil and paper are thin enough and wound tightly enough so that, while spraying the fused metal onto an end face, for example the end face at which the edge portions 28ª of foil member 28 projects, the sprayed metal cannot and does not penetrate deeply enough to contact with the other foil member or strip 30. I achieve this action most advantageously where I employ uncalendered paper for the interposed dielectric and in Figure 7, I have shown in exaggerated cross-section the mechanical relation of the wound parts whereby such penetration of the sprayed metal is prevented.

In Figure 7 it will be noted that such portions of the foil strips 28 and 30 as do not project beyond the side edges of the paper 29 and 31 are practically embedded in the paper, this action being greatly facilitated by the physical properties of the uncalendered paper. The alined edge portions of the two paper strips 29 and 31 which project beyond the unexposed edge portions of the foil strips practically contact with each other and thus form a suitable barrier to prevent ingress of sprayed metal to that foil member which is not intended to be exposed at that end face which is being sprayed.

The metal that I employ for this spraying is conveniently aluminum and it may be sprayed on in any suitable way. For example, I may employ a so-called "metal spray gun" in which a suitable high temperature flame heats to a high enough temperature a wire or strip of metal which is sprayed or deposited in fine particles by means of a suitable air blast, any suitable means being used to feed the wire or strip of metal as it is being consumed. Though the melting point of the metal such as aluminum is relatively high and though, therefore, the particles of metal that strike the end faces of the wound unit are at a correspondingly high temperature, there is no burning of the parts which are sprayed, the parts being of such relatively large mass, compared to the relatively minute particles of fused metal being sprayed, that these parts absorb the heat from these particles so easily and so readily that the particles are quickly cooled, fusing together upon cooling, while the amount of heat which thus is absorbed by particularly the paper insulation 29 and 31 is insufficient to raise the temperature thereof to a harmful value.

I then place against the respective end faces of the condenser unit thus far completed two disk-like members 26 and 27 (see Figures 1, 5 and 8) of identical construction and having a maximum diameter at least equal to the maximum diameter of the wound foil and dielectric unit. These disk-like members, preferably of aluminum, are flanged as at 26ª and 27ª, respectively (Figure 7) and the flanges 26ª and 27ª are fitted snugly inside the outermost ends of the tubular members 23 and 24. The disk-like members 26 and 27 are thus alined with each other and with respect to the axis of the hub 23—25—24 and, where the above-mentioned sprayed coating of metal is relatively thin, they function to mechanically reinforce and protect this sprayed coating. In the exaggerated view of Figure 7 this sprayed coating is indicated at 70.

Figure 8:
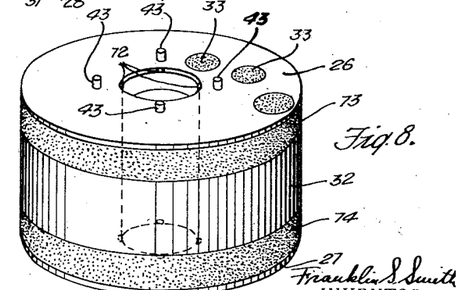
Figure 8 is a detached perspective view of a completed or assembled condenser unit forming part of the apparatus of Figure 1.

The disk members 26 and 27 are provided with suitable recesses 71, preferably four in number (see Figure 5), positioned at intervals of 90° about a circle whose center is concentric with the axis of the condenser unit, and in assembling the two disk members 26 and 27, as above described, the disk members are so positioned that the recesses 71 in one member are in alinement with the recesses in the other. These recesses are adapted to receive dowel pins 43, as is indicated in Figure 8. At the junction of the flanges 26ª and 27ª with the main body portions of the plate or disk members 26 and 27, the latter are provided with threaded openings 72 (Figures 5 and 1) whose axes extend at about 45° to the axis of the condenser unit. These threaded recesses 72 are adapted to receive connectors 48 like that shown in Figure 9. The connector, it will be seen, has a shank portion 48ª threaded to be received within a threaded recess 72 and a terminal or connecting portion 48ᵇ extending at 135° to the shank 48ª, the portion 48ᵇ being provided with suitable openings 48ᶜ to permit a conductor to be secured thereto. The threaded recesses 72 are preferably only three in number but may conveniently be four in number as shown in the drawings (Figure 5) and they extend about a circle at intervals of 90°, being, moreover, so positioned that they fall respectively in the same planes through the axis of the condenser unit as do the dowel-receiving recesses 71. This relation is clearly shown in Figure 5 with respect to the plate member 27, the plate member 26 being of the same construction. Moreover, in assembling the end plate members 26 and 27 with respect to the hub 23—25—24, members 26 and 27 are so placed that these planes that pass through the axis of the unit and the dowel-receiving recesses 71 pass also through apertures 75 (Figure 4) in the radially directed arms 25ᶜ, 25ᵈ, 25ᵉ and 25ᶠ of the insulating member 25. Thus, viewing the assembled unit in plan, a dowel-receiving opening 71, a connector-receiving opening 72, and an aperture 75 in insulating member 25 fall on the same radius.

The disk members 26 and 27 are provided with suitable openings which may conveniently be circular in shape. In Figure 5 these openings are indicated at 27ᵇ with respect to the member 27 and in Figure 7 one of the like openings in the member 26 is shown. The side walls of these openings are inclined or undercut as at 27ᶜ (Figures 5 and 7) and these openings are, moreover, relatively uniformly distributed throughout the members 26 and 27 so as to overlie the sprayed metal coatings 70 (Figure 7) at one or more portions in the latter corresponding to each turn of foil in the condenser unit.

I then spray fused metal, in the manner above described, through these openings 26$^b$ and 27$^b$ and against the annular end faces exposed therethrough, building up, by continuing the spraying, a substantial and relatively strong layer of metal which gradually builds up into these openings 26$^b$ and 27$^b$, the undercut or beveled side walls of these openings providing not only a suitable surface in the members 26 and 27 to which the sprayed metal may attach itself, but also a dependable locking in place of the sprayed metal itself, the latter uniting itself to those portions of the sprayed metal coatings 70 that are exposed through these openings.

Thus, the overlapping or projecting side edge portions 30$^a$ (Figures 6 and 7) of the foil strip 30, which forms one plate of the condenser unit, are mechanically and electrically united with the end member 26 while the side edge portions 28$^a$ of the metal foil 28, which forms the other plate of the condenser unit, are electrically and mechanically united to the member 27. The sprayed metal that is thus built up through the openings of the members 26 and 27 is indicated in Figure 7 at 33 and 34 with respect to members 26 and 27, respectively.

I then spray fused metal, such as aluminum, about the dielectric member 32 (Figures 8 and 1) in two bands 73 and 74, in mechanical and uniting contact with the end plate members 26 and 27, respectively. These bands 73 and 74 may be of substantial thickness and not only mechanically strengthen the condenser unit but also constitute heat-radiating extensions of the end plates or disk members 26 and 27. The adjacent edges of the bands 73 and 74 are spaced apart sufficiently to prevent surface leakage across the dielectric member 32 from one band member to the other, but, as hereinafter more fully described, this spacing is relatively small, due to certain other coacting features of my invention.

The sprayed coatings 70 may be only several thousandths of an inch thick but I do not wish to be limited to such a thickness. If the layer is maintained thin enough, it is permeable and permits the entry of the gaseous dielectric under pressure, hereinafter described, into coacting relation with the paper dielectric. The dielectric member 32 may be of any suitable material and it is preferably sand-blasted before the application of the sprayed metal bands 73—74.

The spraying of metal into the various openings in the side plates 26—27 having been completed, the condenser unit is now ready for assembly with respect to the other units and other parts of the apparatus and, considering now the latter, it may be assumed that six condenser units A, B, C, D, E and F (Figure 1) have thus been completed, all as has been described in detail in connection with unit A.

First there is drilled a suitable opening through the closure member 21 (Figure 1) and through this hole, which is positioned at the center of member 21, is inserted one end of a rod, preferably of metal and conveniently of steel and preferably of round cross-section; the rod is shown in Figure 1 at 35 and is welded to the closure member 21 as at 36, thus to form a strong and secure mechanical interconnection therewith and also a dependable seal. This rod 35 is of sufficient length, when the closure member 21 with the rod 35 secured thereto is inserted into the container 20, to extend through the bottom 20$^a$ of the container, the latter being provided with a suitable opening centrally positioned and rod 35 being reduced in diameter as at 35$^a$ to fit into and pass through this opening in the bottom 20$^a$.

Figure 3:
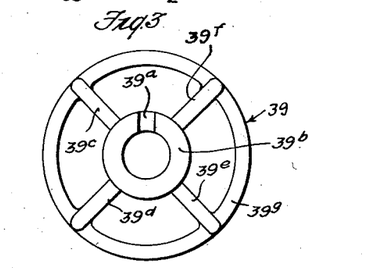
Figure 3 is a plan view on an enlarged scale of one of the parts employed in the assembly.

Upon the rod 35 is then slipped a collar 37, the collar abutting against the under side of the closure 21 and being pinned to the rod 35 by pin 38. Collar 37 is provided with a downwardly directed projection 37$^a$ adapted to be received within a keyway 39$^a$ of a supporting member generally indicated at 39 and shown in plan view in Figure 3.

Supporting member 39 has a collar portion 39$^b$ adapted to fit snugly about the rod 35 and adapted to abut against the fixed collar 37; it is in the collar portion 39$^b$ that the keyway or recess 39$^a$ (Figure 3) is cut for the reception of the projection 37$^a$ of collar 37. Projecting outwardly and downwardly from the collar portion 39$^b$ and integrally formed with the latter are four equidistantly spaced arms 39$^c$, 39$^d$, 39$^e$ and 39$^f$ (Figure 3) terminating in a ring portion 39$^g$. Member 39 may thus rest against the collar 37 and is prevented from rotating about the rod 35 by the interlocking of the two parts at 37$^a$—39$^a$.

Seated against the ring member 39$^g$ is a ring-like insulating member 40 (see also Figure 10) provided with four inwardly and radially extending arms 40$^a$, 40$^b$, 40$^c$ and 40$^d$, each provided with an aperture adjacent its inner end.

The adjacent faces of the ring members 39$^g$ and 40 are suitably shaped, as is plainly shown in Figure 1, so as to interfit and to cause the ring member 39$^g$ to center the member 40 with respect to the member 39 and the rod 35 and also to prevent displacement of insulating member 40 laterally with respect to member 39 or member 35. In carrying on the assembly of the parts, the rod 35 with its attached closure member 21 is held in any suitable way in a position inverted from that shown in Figure 1, so that the parts 39, 40 and subsequent parts may be strung upon and about the rod 35 and seated, during the process of assembly, one against the other. Member 39 has four arms as above pointed out and in assembling insulating member 40 with respect to member 39, member 40 is so positioned that the arms 40$^a$, 40$^b$, etc., of member 40 are alined with respect to the openings formed in member 39 between the arms 39$^c$, 39$^d$, etc. (see Figure 3), a suitable dowel pin or pins 41 being used to prevent rotary displacement of the parts from this relation.

Then I string upon the rod 30 a completed condenser unit, more specifically condenser unit F of Figure 1, the unit F being seated against the insulating member 40 with the end disk 26 thereof in contact with insulating ring 40. Unit F is held against lateral displacement by means of the member 25 (see Figure 4) which is provided with four inwardly and radially extending arms 25$^c$, 25$^d$, 25$^e$ and 25$^f$, the ends of these arms terminating in a collar 25$^g$ whose radius is equal to that of the rod 35. The collar 25$^g$ of member 25 thus engages rod 35 and holds unit F against sidewise movement.

Unit F is so positioned that the above-mentioned inwardly directed arms of member 25 with the openings therein (see Figure 4) are alined respectively with the arms and the openings therein of insulating member 40 (see Figure 10), suitable dowel pins 43 set in suitable recesses in members 40 and 26 (Figure 1) holding unit F against rotary displacement with respect to member 40.

However, as unit F is strung or threaded onto the central rod 35, the latter being still in inverted position, it is also strung onto a suitable number of connecting bars, in this particular illustrative assembly, four in number, two of which W and X are shown in Figure 1. These connecting rods or bars have their upper ends threaded (see upper portion of Figure 1) and they are threaded into and in fact through the openings in the arms 40ª, 40ᵇ, 40ᶜ and 40ᵈ of insulating member 40 (see also Figure 10). In Figure 10 these connecting bars W, X, Y and Z are indicated, and in fact they may be assembled with respect to the insulating member 40 before the latter is inserted in position as above described. These four connecting bars, made of a suitable conducting material such as copper, are thus equidistantly spaced about and away from the central supporting bar or rod 35, and as unit F is strung onto the rod 35, insulating member 25 of unit F has its arms 25ᵈ, 25ᵉ 25ᶠ and 25ᶜ (see Figure 4) strung onto connecting bars W, Y, X and Z, respectively.

The upper ends of connecting bars W, X, Y and Z have suitably secured thereto (see the upper part of Figure 1) suitable wires or conductors, each leading to a suitable bushing or terminal construction mounted on the closure member 21; in Figure 1 two of the four insulating bushings are shown in side elevation at 44 and 45 from which conductors 46 and 47 lead respectively to connecting bars W and X, to which they are secured in any suitable manner. In the embodiment of Figure 1, four terminal bushings are employed and they are of any construction suitable or appropriate for passing the potential of the circuit to which the condenser is connected through the metallic closure 21.

After unit F has been placed in position, a suitable connector 48 (see Figure 12), previously secured to the disk member 26 of unit F and which disk member is, as above described more specifically in connection with the construction of unit A, in electrical connection with one of the foil electrodes of unit F, is connected mechanically and electrically to one of the connecting bars W, X, etc., illustratively, in Figure 1, to connecting bar W.

Thereupon, unit E is threaded onto the bar 35 and onto the connecting bars W, X, Y and Z, the disk member 26 of unit E resting against the disk member 27 of unit F and thus forming an electrical connection between the other foil electrode of unit F and the one foil electrode of unit E. A connector 48 (see Figure 12) electrically connects the other disk member 27 of unit E to one of the other connecting bars, specifically connecting bar X.

Thus, the two condenser units E and F are electrically connected in series and bridged across connecting bars W and X.

Unit E having been put in position, and where, as will be hereinafter more clearly described, it is desired to insulate the next succeeding unit from unit E, I then place against disk member 27 of unit E a ring-shaped insulator 53 (see Figure 1) utilizing dowel pins 43 to hold the ring 53 against sidewise displacement, and then I string the next unit D into position and onto the supporting rod 35 and the connecting rods W, X, Y and Z. In like manner units C, B and A are placed in position, but with another insulator 53, interposed between units B and C.

In each instance the arms 25ᶜ, 25ᵈ, etc., and collar 25ᵍ, of insulating members 25 (see also Figure 4) fit about the supporting bar 35 and the connecting bars W, X, Y and Z pass through the openings 75 therein; thus, the units are accurately alined while the relatively long connecting conductors W, X, Y and Z are dependably supported by the arms of insulating member 25 at appropriate points along their lengths. Preferably, dowel pins 43 are employed to prevent the possibility of rotary displacement of any of the condenser units or of the insulator 53.

The connection of the remaining condenser units to the connecting rods W, X, etc., achieved by connectors such as connectors 48 above-mentioned, will be described in detail hereinafter.

With closure member 21 and supporting rod 35 still in inverted position, an insulating member 57 (see bottom portion of Figure 1) is then threaded or strung onto the bar 35 and onto the connecting rods W, X, Y and Z, member 57 being in effect a duplicate of insulating member 40 described above in detail and shown in plan view in Figure 5, the ends of these connecting rods just projecting through the inwardly directed arms 40ᵈ of insulating ring 57. Suitable dowel pins 41 may be employed to prevent relative displacement between unit A and insulator 57.

Figure 2:
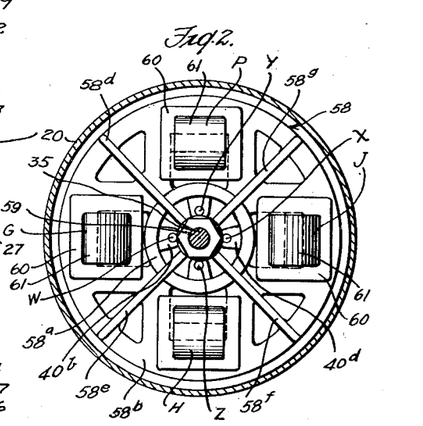
Figure 2 is a horizontal sectional view, as seen along the line 2—2 of Figure 1.

There is then seated upon member 57 a frame-like member 58 having a ring portion 58ª interfitted with insulator 57, an outer ring-like member 58ᵇ (see Figure 2), and an innermost ring or collar portion 58ᶜ (see Figure 1), the latter fitting over the end of supporting rod 35. These ring-like portions of the frame member 58, which is of a suitably heavy metallic construction, are rigidly interconnected by radially extending arms preferably formed integrally therewith and preferably four in number. In Figure 2 these radial arms are shown in plan at 58ᵈ, 58ᵉ, 58ᶠ and 58ᵍ. Member 58 is so positioned that the bisectors of the angles between the radial arms thereof overlie or are in alinement with the connecting bars W, X, Y and Z, this relation of the parts being clearly shown in Figure 2.

A nut 59 is then threaded onto the reduced threaded end of supporting rod 35 and is tightened up to dependably and securely hold the various condenser units and insulating members above-described clamped between frame-like member 58 (see bottom portion of Figure 1) and member 39 (upper portion of Figure 1). In order to insure greater nicety of this clamping action and to facilitate the assembly of the construction, the annular disk-like plate members of the condenser units, as shown best in Figure 1 in the showing of members 26 and 27 of unit A, are of diminishing thickness toward the outer periphery thereof. This insures that adjacent condenser units contact with each other at innermost annular surface portions of these annular disk members so that the clamping action is not interfered with by possible inaccuracies or irregularities at points remote from the axis of the units. These regions of contact are indicated at K in Figure 1 and it will also be noted that the diminished thickness of the end plate members of the units provides for a space, indicated at M between adjacent units.

Supported by ring portions 58ª and 58ᵇ (Figure 2) and positioned in the space between the radial ribs or arms of member 58 are discharge coils, illustratively four in number, where the condenser construction above-described is arranged, as will be described hereinafter, for 3-phase operation; these discharge coils are shown in Figure 2 at G, P, H and J and are preferably of identical construction. Each may therefore comprise a core 60 of the shell type and a winding 61 having two terminals. These discharge coils preferably rest with the shell core in engagement with the ring portions 58ª and 58ᵇ of the frame member 58 (see lower part of Figure 1), the winding 61 being accommodated in part in the space between these two ring portions. The discharge coils may be secured to clamp 58 in any suitable manner. The terminals of these discharge coils are connected by suitable conductors to the ends of the connecting bars W, X, Y, Z, the type of connection being described hereinafter.

The construction, having been assembled, thus far as above described, and, up to this point, still assuming a position inverted from that shown in Figure 1, is now turned upside down and let down into the tank or container 20, the lowermost end and reduced portion 35ª of the rod 35 entering and passing through a centrally positioned opening in the bottom 20ª of the tank 20 and the closure member 21 passing slightly into the upper portion of the tank 20. The upper peripheral portion 20ᵇ of the container is then bent inwardly over the closure member 21 and the overlapping parts of members 20 and 21 are then welded together as at 22. The projecting end 35ª of rod 35 (see lower portion of Figure 1) is then welded to the bottom 20ª, as is indicated at 62.

The container 20, thus sealed, is now ready to receive the dielectric which, as above noted, is preferably a gaseous dielectric under high pressure. The gas may be introduced in any suitable manner but a preferred and advantageous way of introducing the gas is as follows:—The upper end of rod 35 (see upper portion of Figure 1) has a passage 63 drilled into it substantially along its axis, passage 63 connecting with a transverse passage likewise formed by drilling into the rod 35, thereby forming a radially extending passage in communication with passage 63. Collar 37 has a peripherally extending channel 37ᶜ upon the inside surface thereof, the above-mentioned radial communicating passage being exposed to this channel, and communicating with this channel 37ᶜ is a small passage 37ᵇ drilled through the collar 37. The upper end of passage 63 in rod 35 is threaded so that a tight connection may be made thereto and from thence to the apparatus for forcing the gas into the sealed container. This gas may comprise nitrogen or carbon dioxide or any other suitable gas. After the air is withdrawn from the container the introduction of the gas is started and continues until a pressure on the order of 15 atmospheres per square inch is achieved.

The connections are then removed from the threaded channel 63 and a pressure-indicating gage 64 threaded into the upper end of the rod 35, thus sealing the passage through which the container was filled. Preferably the passage 37ᵇ in collar 37 is so small that only an inappreciable amount of gas is lost during the interval between the disconnection of the gas-applying apparatus from passage 63 and the connection thereto of the pressure gage 64.

Considering now how the condenser units A, B, C, etc., are electrically connected together, it might first be noted that the arrangement I have above described and the method of assembly permits of a very wide variety of ways in which the condenser units can be connected together. And bearing in mind that the usual forms of alternating current supply systems are either single-phase, 2-phase, or 3-phase, various possible connections may now be considered to meet various of the many possible conditions met with in such systems of supply.

Figure 14:
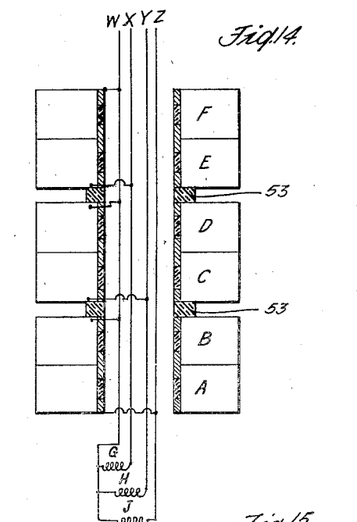
Figure 14 is a schematic showing of the 3-phase Y-connected condenser units.

Referring now to Figure 14, in which is schematically indicated the arrangement above-described in detail in connection with Figure 1, let it be assumed that the condenser is to be applied to a 3-phase circuit and that the units are desired to be Y-connected. Accordingly, serially connected units E and F are bridged across the connecting bars W and X, serially connected units C and D are bridged across the connecting bars W and Y, and serially connected condenser units A and B are bridged across connecting bars W and Z. To effect this bridging connection, connectors like the connector 48 of Figure 9 are employed. The resultant connection is diagrammatically shown in Figure 15 from which the Y- or star-connection will be readily perceived, connecting bar W becoming the neutral which may be grounded if desired or which may be carried out through one of the terminal bushings shown in Figure 11; in this figure, which is a plan view as seen from above in Figure 1, the four high voltage terminal bushings 44, 76, 45 and 77 are shown respectively connected to the connecting bars or bus-bars W, Y, X and Z, respectively.

In assembling the various units for achieving the above-described Y-connection, the relation of the connector-receiving opening 72 (Figures 5 and 8) in the end plates 26 and 27 with the dowel-receiving openings 71 (Figure 5) comes into effect in order to properly aline the connectors 48 (Figure 9) with respect to the connecting bus-bars W, Y, X, Z which, as is now clear, are arranged in a circle about the supporting rod 35 and are spaced from each other by 90°.

In this connection, it is first to be noted that the member 39 (at the upper part of Figure 1) is held against rotation about the supporting rod 35 and that dowel pins 41 hold the insulating support 40, in which the four connecting or bus-bars are anchored, against rotation with respect to member 39 and hence with respect to the rod 35. The under surface of insulating member 40, as viewed in Figure 1, is provided with four dowel-receiving openings 78 (see Figure 10) on the same diameters with the openings in the arms 40ª, 40ᵇ, etc., in which the connecting bus-bars W, Y, X and Z are held. These dowel-receiving openings 78 are adapted to be registered with dowel-receiving openings 71 (see Figure 5) in one of the end plates 26 or 27 of unit F, the dowel pins 43 thus insuring that the unit F is not only held against rotation but is properly positioned so that the openings 75 in the insulating member 25 (see Figures 1 and 4) are in alinement with the respective connecting bus-bars W, X, etc.

Figure 12:
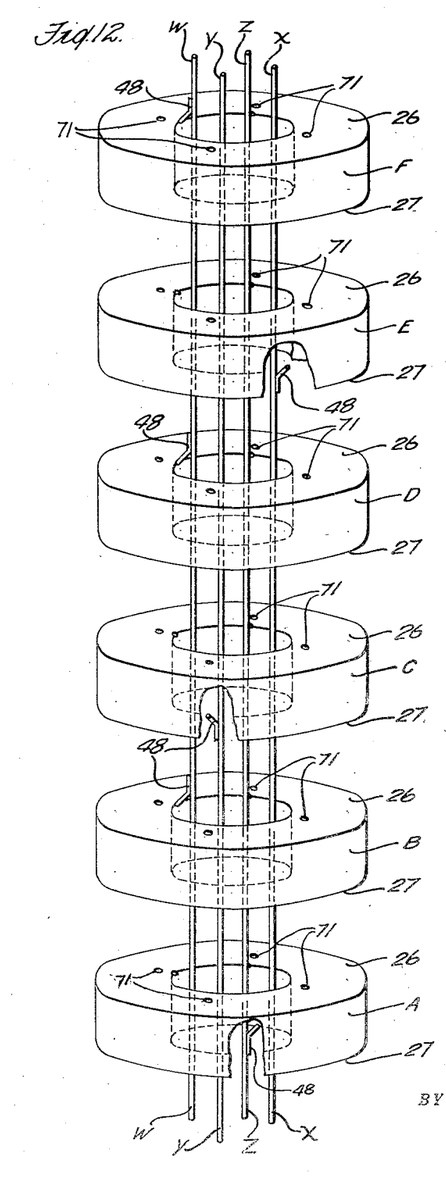
Figure 12 is an exploded diagrammatic perspective view showing a possible way in which the condenser units of the construction of Figure 1 may be interconnected and specifically shows these units as Y-connected for 3-phase operation.

At the same time, referring now to Figure 12, a connector 48 screwed into one of the openings 72 (Figure 5) in the upper end disk member 26 of unit F is properly positioned with respect to the connecting bus-bar W, the bend in the connector 48 (see Figure 9) being such that the portion 48ᵇ thereof rests against and is parallel with the connecting bus-bar W to which it is secured in any suitable manner.

Figure 13:
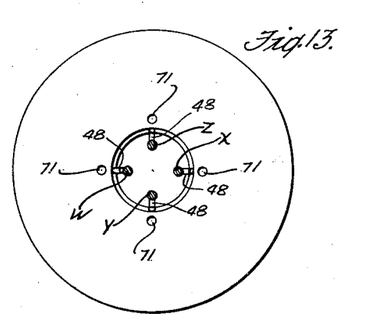
Figure 13 is a plan view, as seen from above in Figure 12.

Unit E, referring again to Figure 12, before being threaded onto the rod 35, is provided with a connector 48 screwed into an opening 72 in the lower end disk member 27 and as unit E is brought into abutting relation to unit F, it is held in a position with the connector 48 adjacent the bus-bar X which (see Figure 13) is diametrically opposite connecting bar W; the dowel-receiving openings 71 in end plate 27 of unit F (Figure 12) are brought into registry with the dowel-receiving openings 71 in the upper plate 26 of unit E so that the dowel pins 43, of which two or more may be employed, enter these registering openings. Thus, unit E is properly related to unit F and to the related parts, whence connector 48 may be electrically connected to bus-bar X.

Figure 15:
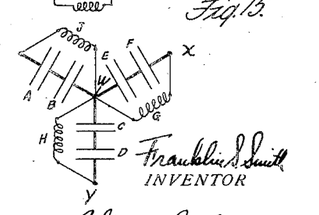
Figure 15 is an electrical diagram of the connections of Figure 14.

In a similar manner units D, C, B and A, still referring to Figure 12, are placed in position, it being pointed out that, where insulating ring members 53 (Figure 1) are employed between certain of the condenser units, these rings 53 are provided with dowel-receiving openings for receiving the dowel pins 43 (Figure 1) that are similarly spaced as are the dowel-receiving openings 71 in the end members of the units. Thus, in assembly, the various connectors 48, clearly indicated in Figure 12, are properly related to their intended bus-bars, as clearly appears from Figures 12 and 13.

Where the units are Y-connected, as in Figures 12, 14 and 15, three of the discharge coils G, H and J are connected by suitable conductors to the connecting bus-bars W, X, Y and Z, the coils and their connections being diagrammatically shown in Figure 14 and also in Figure 15, from which it will be seen that a discharge coil is connected in parallel with the condenser in each branch of the Y.

Where the Y- or star-connection of this character is desired, the interposed insulators 53 (Figures 1 and 14) are employed, these insulators being proportioned to withstand the potential effective across any phase.

Figure 18:
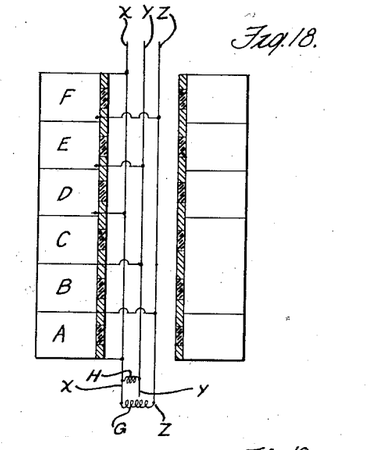
Figure 18 is a schematic showing of the connection of the units of Figure 16.
Figure 19:
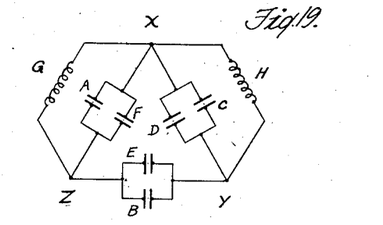
Figure 19 is an electrical diagram of the delta-connection of Figure 18.

Should it be desired, however, to connect the condenser units for delta operation across a 3-phase line, the interposed insulators, such as the insulators 53, may be dispensed with, the assembly proceeding as above-described in detail but omitting the insulators interposed between adjacent condenser units. As the assembly proceeds, the condenser units are connected, by connectors such as connector 48 of Figure 9, as is schematically shown in Figure 18, from which it will be seen that unit F is bridged across bars X and Z, unit E across bars Y and Z, unit D across bars Y and X, unit C across bars Y and X, unit B across bars Y and Z, and unit A across bars Z and X, resulting in an electrical diagram as shown in Figure 19.

Figure 16:
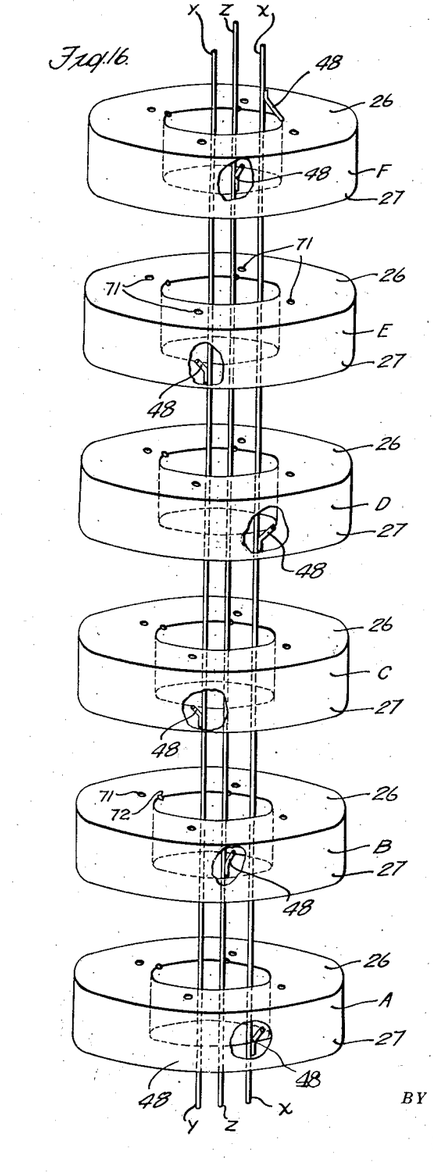
Figure 16 is an exploded diagrammatic perspective view showing one of the many other possible ways of interconnecting the condenser units of Figure 1, and specifically showing these units delta-connected for 3-phase operation.

With such a connection, one of the connecting bars, such as connecting bar W, may be dispensed with. In Figure 16 is shown in diagrammatic exploded perspective view showing the way in which the successive steps of successively assembling the units F, E, D, C, B and A (in that order) are carried on, and referring to Figure 16 it will be seen that unit F has connectors 48 associated with the end plates 26 and 27 and intended for electrical connection to the bars X and Z (see Figure 18). Now bars X and Z are displaced from each other by a 90° angle, as appears clearly from Figure 17. Hence, the connector 48 is threaded into one hole 72 (see Figure 8) in the upper end plate 26 and a connector 48 (see Figure 16) is threaded into a hole 72 in the lower end plate 27 displaced 90° in counter-clockwise direction, as viewed in Figures 16 and 17, from the hole in which the connector 48 has been threaded into the upper plate 26. When unit F, therefore, is related by the dowel pins 43 to the upper insulator 40 (Figure 1) these two connectors are properly positioned adjacent to the bus-bars X and Z, respectively.

The remaining units, as appears clearly from Figure 16, have connectors 48 related thereto and each time that a unit is threaded onto the rod 35 and onto the bus-bars, it is so positioned that the connector or connectors 48 come alongside the connecting bus-bar to which it or they are intended to be connected, the dowel pins 43 insuring the maintenance of this relation as the units are successively abutted against each other.

Figure 17:
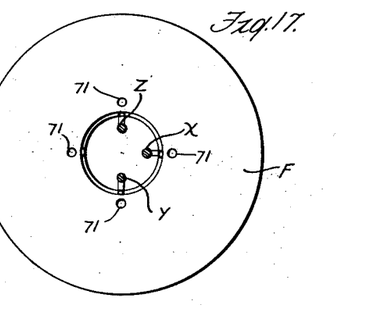
Figure 17 is a plan view, as seen from above in Figure 16.

When finally assembled, the connectors 48 fall in radial planes coincident with the respective connecting bars, as is plainly shown in Figure 17.

The resultant electrical arrangement is diagrammatically shown in Figure 19 in which it will be seen that the arrangement is substantially a double delta arrangement or a delta arrangement in which units A and F are in parallel in one branch, units C and D are in parallel in another branch and units B and E are in parallel in another branch. In a delta arrangement, it is sufficient to employ only two discharge coils and hence discharge coils G and H are shown bridged respectively across connecting bus-bars X—Z and X—Y. The condensers B and E (Figure 19) can discharge through coils G and H in series.

Figures 11, 20, 21, 22, 23, 24, 25, 26, 27:
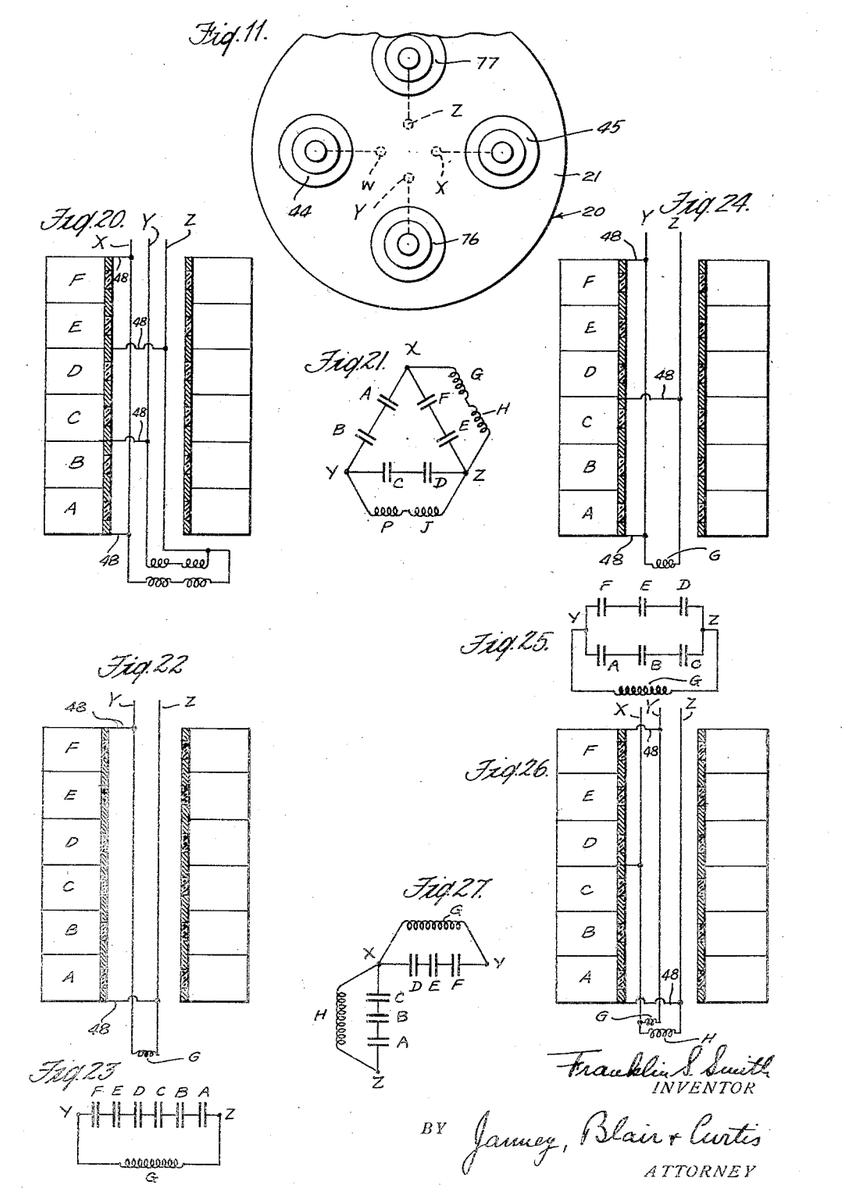
Figure 11 is a plan view of the apparatus shown in Figure 1, certain of the parts being indicated diagrammatically.
Figure 20 is a schematic showing of another possible way of delta-connecting the units.
Figure 21 is an electrical diagram of the connections of Figure 20.
Figure 22 is a schematic showing of the apparatus of Figure 1 with the units connected in series and for single-phase operation.
Figure 23 is an electrical diagram of the connections of Figure 22.
Figure 24 is a schematic showing of a possible other way of connecting the units for single-phase operation.
Figure 25 is an electrical diagram of the connections of Figure 24.
Figure 26 is a schematic showing of how the units of Figure 1 may be connected for 2-phase operation.
Figure 27 is an electrical diagram of the connections of Figure 26.

As further illustrative but not by way of limitation, of the flexibility of the electrical arrangement of the condenser units, reference may now be made to Figure 20 in which is schematically shown how the six units are connected in delta with two condenser units in series in each arm of the delta. Thus, units F and E are bridged across connecting bus-bars X and Z, units D and C are bridged across connecting bus-bars Z and Y and units B and A are bridged across connecting bus-bars Y and X, this arrangement being achieved by the employment of only four connectors 48. With such an arrangement, two discharge coils G and H are connected in series and bridged across connecting bus-bars X and Z and the two other discharge coils P and J are connected in series and bridged across connecting bus-bars Y and Z. The resultant arrangement is diagrammatically shown in Figure 21.

The arrangements of Figures 20 and 21 also illustrate, with respect to the arrangement of Figures 18 and 19, for example, a further flexibility of arrangement and construction. Assuming the individual condenser units of Figures 18 and 20 to be intended to operate under the same voltage, the voltage across any two connecting bus-bars of Figure 20 will be twice that of the voltage across any two connecting bus-bars in Figure 18; while the individual discharge coils may be intended to function at the potential of any one condenser unit, yet by connecting two of them in series as in Figures 20 and 21, the same discharge coils may be employed to meet the higher voltage conditions of an arrangement like that of Figure 20.

On the other hand, if it is desired to operate the condenser single-phase and to connect all of the units in series, the resultant arrangement is schematically shown in Figure 22. Only two connecting elements 48 are required, one to connect the upper plate disk of unit F to connecting bar Y and the other to connect the lower plate disk of the lowermost unit A to connecting bar Z, this arrangement also requiring only two connecting bars across the lowermost ends of which one discharge coil G is connected, resulting in an electrical arrangement diagrammatically shown in Figure 23.

In Figure 24 is illustrated one of many possible other connections of the units for single-phase operation, units D, E and F being arranged in series and bridged across connecting bars Y and Z and units C, B and A, also in series, being bridged across these connecting bars Y and Z with a single discharge coil G appropriate to the voltage (or several coils in series) bridged across the lowermost ends of the connecting bars. The resultant electrical arrangement is diagrammatically shown in Figure 25.

As typifying a possible 2-phase arrangement, reference may be made to Figure 26 in which condenser units D, E and F, in series, are bridged across connecting bars X and Y, across the lower ends of which a suitable discharge coil G is bridged, and condenser units A, B and C in series, are bridged across connecting bars X and Z, across the lower ends of which is bridged a suitable discharge coil H. The resultant electrical arrangement is diagrammatically indicated in Figure 27.

Figure 28:
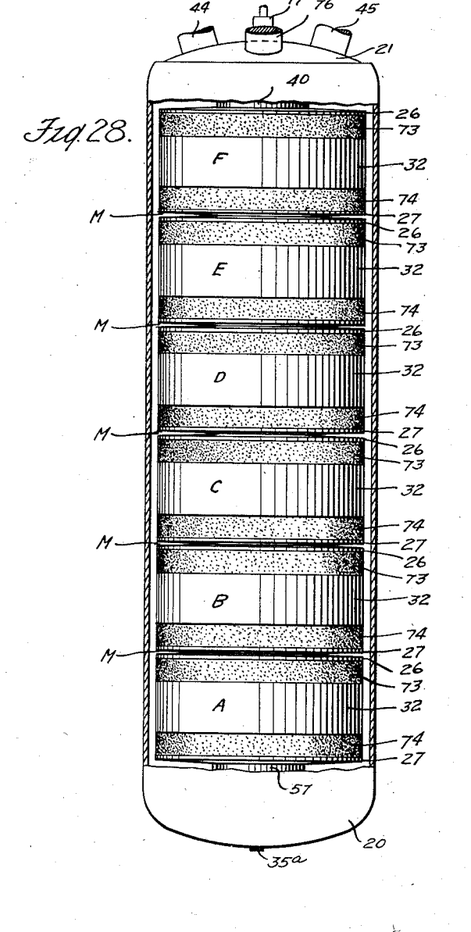

It will be noted that some of the illustrative electrical connections or arrangements above described, for example, those of Figures 18, 20, 22, 24 and 26, do not require the insertion between condenser units of insulators such as the ring insulators 53 of Figure 1 and to show, among other things, the unique and highly advantageous compactness and simplicity of resultant construction, reference should be made to Figure 28 in which the relation of the various condenser units, illustratively six in number, is shown under these circumstances. The contact between the end metal member 27 of one unit and the adjacent end metal member 26 of the adjacent unit achieves a dependable electrical connection while the tapered spaces M between the units is also clearly shown in Figure 28, these spaces facilitating dissipation of heat by the dielectric cooling medium employed.

It is to be understood that the arrangement shown in Figures 12, 14 and 15 is illustrative of one in which it may be necessary or desirable to employ one or more interposed insulating spacers, such as member 53 of Figure 14. So flexible is my construction, however, that I may achieve a Y-connection for 3-phase operation even without the use of such spacers, and in Figure 29 such a Y-connection is schematically shown.

Figure 29:
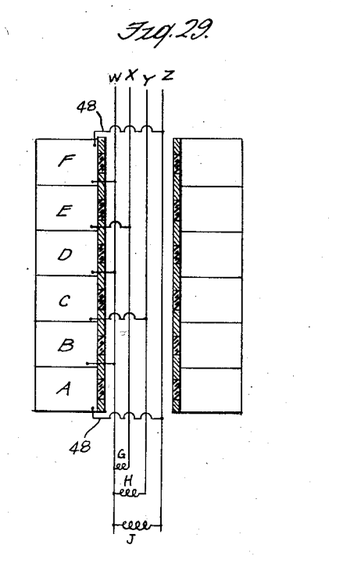
Figure 29 is a schematic showing of a possible way of connecting the six units.
Figure 30:
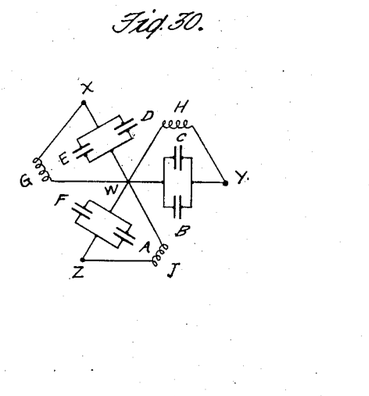
Figure 30 is an electrical diagram of the connections of Figure 29.

Turning now to Figure 29, condenser unit F is bridged across bus-bars or connecting bars W and Z; unit E is bridged across bars W and X; unit D is bridged across bars X and W and thus placed in parallel with unit E; unit C is bridged across bars W and Y and the same is true of unit B which is thus placed in parallel with unit C; and unit A is bridged across bars W and Z and is thus placed in parallel with unit F. Note that only seven connectors 48 need be employed to bring about this connection and that no interposed separating insulators need be employed. Discharge coils G, H and J are also Y-connected, as appears from the connections shown in Figure 29. The resultant electrical arrangement is diagrammatically shown in Figure 30 from which the Y-connections clearly appear with two condenser units in parallel in each phase.

The angular displacement of the holes 72 (Figure 8) about the axis of the units and the like angular displacement of the openings 71 (Figure 5) for receiving the dowel pins 43, thus appropriately related to the angular displacement of the connecting bus-bars, illustratively, in the above-described preferred embodiment of my invention, 90°, will thus be seen to contribute toward the wide flexibility of interconnection of the units to meet any of the widely varying conditions of practical use and also to facilitate greatly the assembly. I find it sufficient to employ only three connector-receiving openings 72 (Figure 8) though I do not intend to be thus limited, since, with a 90° displacement of the connecting bars, either a 90° or 180° displacement of connectors 48 in the upper and lower plates of any single unit, will be found to be necessary, and three such angularly displaced openings 72 in the two end plate members of each unit will give either a 90° or 180° displacement of the connectors 48. Also, by way of the above-described features, all of the individual units can be made of identical mechanical construction, thus making it possible to standardize parts and decrease cost of production, while the above-described flexibility of electrical arrangement makes it possible for me to make up quickly a condenser that will meet any one of a vast variety of requirements that practice might dictate.

As above pointed out, the container 20 is filled with a gaseous dielectric under pressure. This dielectric coacts in a unique way with various other features of the construction above described. For example, the high pressure gaseous dielectric, which has an exceedingly high dielectric strength compared to air at atmospheric pressure, enters the individual condenser units and enters in between the layers of dielectric and the foil plate members. Where this solid dielectric is paper, such as uncalendered paper, this gaseous dielectric of such high dielectric strength fills up all of the pores in the paper and any spaces between the layers thereof or between the paper and the foil and in coaction with the paper makes it possible for me either to use less solid dielectric insulation (such as the paper) or, for a given amount of solid dielectric insulation, to operate the condenser unit at a much higher voltage than would otherwise be possible.

To make this latter action a little clearer, it might be pointed out that the permittivity of paper is much higher than the permittivity of air at atmospheric pressure, the permittivity of the latter being unity while the permittivity of paper is on the order of 3 or 4. Were the pores or spaces in or between the paper insulation to be filled with air at atmospheric pressure, the latter being a relatively weak dielectric, the dielectric stress which the paper is intended to withstand is sub-divided between itself and the air in inverse proportion to their respective permittivities; the weak dielectric, the air at atmospheric pressure, is made to assume three or four times the dielectric stress that is assumed by the paper. As a result of this action, the air is easily overstressed, breaks down, and thus breaks down the paper.

With my arrangement, however, the gaseous dielectric under pressure has such a high dielectric strength that it can assume easily three or four more times the stress assumed by the paper without becoming over-stressed, and thus the composite dielectric thus provided is far superior.

The gaseous dielectric under pressure easily penetrates into the interior of the individual units since, as above pointed out, the relatively thin coating of metal that is sprayed onto the end faces of the individual units as they are being constructed is permeable and permits the gas to pass therethrough; moreover, if desired, suitable apertures or spaces may be provided, as by leaving certain areas unsprayed with metal, if it is desired in this manner to facilitate the entry of the gas into coacting relation to the paper insulation, though satisfactory results are achieved where the permeability of the relatively thin coating of metal is relied upon.

Referring now to Figure 1, it will be noted that about the central supporting rod 35 there extends a substantially annular passage, formed by the hollow hub members of the alined units, such members as the parts 25, the insulating member 40, the support 39, the insulating member 57, and the end clamping plate 58 being shaped, by reason of the provision therein of spaced radial arms (see Figures 2, 3, 4 and 10) so as not to obstruct this annular passage. Moreover, the outside diameter of the alined units A, B, C, etc., is less than the inside diameter of the tank or container 20, thus forming an annular passage about the stack of condenser units. These annular passages are connected at the top and bottom, as appears clearly from Figure 1. Through the connected passages thus provided, the gaseous dielectric under pressure may circulate, abstracting heat from the units and transferring such heat to the relatively large exposed area of the container walls for dissipation. Thus, the gaseous dielectric not only takes part in achieving highly efficient insulation but also takes part in the dissipation of heat losses in the condenser units themselves.

In this latter connection, it is to be pointed out that I have provided a thoroughly efficient means for conducting the heat away from the coiled or wound foil plate members; the latter are, by reason of the sprayed metal construction above-described, in intimate thermal contact with the upper and lower plate members 26 and 27 so that the latter quickly absorb the heat conducted to them directly by the foil plates. This latter heat conduction is particularly efficient because one entire edge of each coiled plate is in intimate thermal contact with an end disk or plate member.

From these plate members, which of themselves provide a large heat-dissipating area exposed through the spaces M (see Figure 1), the heat is further conducted to the metal hub members 23 and 24 which are exposed to the inside annular passage and also to the sprayed metal bands 73 and 74 (see Figure 8). These bands 73—74 are exposed directly to the outermost annular passage and are thus readily swept by the circulating gaseous dielectric which is thus enabled to quickly abstract heat therefrom.

Moreover, the bands 73 and 74 (Figure 8) may be made relatively wide and made to extend near to each other, due to the gaseous dielectric under pressure. This is because the gaseous dielectric under pressure contacts with the exposed surface of the solid dielectric material 32 (Figure 8) and acts to increase vastly the resistance of the latter to surface leakage. By increasing the width of bands 73 and 74 I am also able to increase still further the heat-radiating surface of metal parts.

Thus, it will be seen that I have provided in this invention a condenser construction and a method of achieving the same in which the several objects hereinbefore noted, together with many thoroughly practical advantages, are successfully achieved.

As many possible embodiments may be made of the mechanical features of the above invention and as the art herein described might be varied in various parts, all without departing from the scope of the invention, it is to be understood that all matter hereinabove set forth or shown in the accompanying drawings is to be interpreted as illustrative and not in a limiting sense.

I claim:

1. In condenser construction, in combination, a casing having a cover member, a rod supported by said cover member, a plurality of annular insulated condenser elements strung one after the other and lengthwise of and onto said rod, means for interfitting adjacent ends of said elements and for thereby holding them against displacement with respect to each other, means at the ends of said rod for engaging the end portions of the end elements of said plurality of condenser elements and for thereby holding them against displacement with respect to said rod, and means at the bottom of said container for holding the other end of said rod.

2. In condenser construction, in combination, a container, a plurality of condenser units each having a central opening therethrough, a rod supported within said container and extending through the openings in said units, said rod being of lesser thickness than the dimensions of said openings, apertured means for holding said units in alinement with said rod, and a dielectric medium adapted for circulation through the openings in said units and through said apertured means.

3. In condenser construction, in combination, a cylindrical support having spaced side flanges insulated from each other, said side flanges being apertured, and a capacitor structure comprising two strips of foil alternated with sheet insulating material extending spirally about said support and between said flanges, one strip of foil being exposed from said capacitor structure adjacent to one flange and the other strip of foil being exposed from said capacitor structure adjacent the other flange, said apertures having undercut walls, and metallic means electrically connecting the exposed foil to its adjacent flange, said metallic means being interlocked in said apertures.

4. In condenser construction, in combination, a plurality of alined condenser units having opposed plate electrodes, each unit having an opening therethrough and connecting means exposed toward said opening for making electrical connection to the plate electrodes of the unit, a plurality of bus-bars insulated from each other and extending through the alined openings in said units, and said connecting means connecting plate electrodes of said units to said bus-bars.

5. In condenser construction, in combination, a plurality of alined condenser units having opposed plate electrodes, each unit having an opening therethrough and means exposed toward said opening for making electrical connection to the plate electrodes of the unit, relatively rigid means extending through the alined openings in said units, spacer members between each unit and said rigid means for holding the units alined with respect to the latter, said spacer members being made of insulating material, and a plurality of connecting bars insulated from each other and passing through the alined openings in said units, said conducting bars being in electrical connection with said first-mentioned means and said spacer members allowing passage through said alined openings in said units.

6. In condenser construction, in combination, a plurality of alined condenser units having opposed plate electrodes, each unit having an opening therethrough and means exposed toward said opening for making electrical connection to the plate electrodes of the unit, relatively rigid means extending through the alined openings in said units, spacer members between each unit and said rigid means for holding the units alined with respect to the latter, said spacer members being made of insulating material and having alined apertures therein, and a plurality of connecting bars extending through said alined openings in said units and supported in said alined apertures in said spacer members, said connecting bars being in electrical connection with said first-mentioned means.

7. In condenser construction, in combination, a plurality of condenser units having plate electrodes and each having an opening therethrough and having conductive end elements, each in electrical connection with a plate electrode of the unit and adapted, when said units are stacked one upon the other, to connect the latter in series, means holding said units in stacked relation and with the openings therein substantially alined, a plurality of conductors insulated from each other and extending through the alined openings in said units, and means for electrically connecting end elements of said units to said conductors.

8. In condenser construction, in combination, a plurality of condenser units having plate electrodes and each having an opening therethrough and having conductive end elements, each in electrical connection with a plate electrode of the unit and adapted, when said units are stacked one upon the other, to connect the latter in series, insulating means between end elements of certain of said units, a plurality of bus-bars insulated from each other and extending through the substantially alined openings in said units, and means for electrically connecting end elements of the latter to said bus-bars.

9. In condenser construction, in combination, a plurality of condenser units, each made up of alternate foils and strips of insulation spirally wound, means holding said units in substantial axial alinement, said means extending through central openings in said units, a plurality of bus-bars extending lengthwise of said units, and means for electrically connecting said units and said bus-bars.

10. In condenser construction, in combination, a plurality of annular condenser units, each made up of alternate foils and strips of insulation spirally wound, the foil of each unit forming the opposed plate electrodes thereof, annular metallic end plates for each unit, each end plate being in electrical connection with a plate electrode of its associated unit so that said units are connected in series when they are stacked with adjacent end plates in contact with each other, a plurality of bus-bars extending lengthwise of and through said stacked annular units, and means for making electrical connection from end plates to said bus-bars as desired.

11. In condenser construction, in combination, a plurality of condenser units, each made up of alternate foils and strips of insulation spirally wound, metallic end plates for each unit, each end plate being in electrical connection with a foil of its associated unit so that said units are connected in series when they are stacked with adjacent end plates in contact with each other, a plurality of bus-bars extending lengthwise of said stacked units, and means electrically connecting said end plates to said bus-bars as desired.

12. In condenser construction, in combination, a plurality of condenser units, each made up of alternate foils and strips of insulation spirally wound, the foil of each unit forming the opposed plate electrodes thereof, annular metallic end plates for each unit, each end plate being in electrical connection with a plate electrode of its associated unit so that said units are connected in series when they are stacked with adjacent end plates in contact with each other, insulating means interposed between adjacent end plates of certain adjacent units, and means for making electrical connection to the end plates as desired.

13. In condenser construction, in combination, a plurality of condenser units, each made up of alternate foils and strips of insulation spirally wound, metallic end plates for each unit, each end plate being in electrical connection with a foil of its associated unit so that said units are connected in series when they are stacked with adjacent end plates in contact with each other, means for preventing conductive contact between adjacent end plates of two or more adjacent units, a plurality of bus-bars extending lengthwise of said stacked units, and means for connecting end plates as desired to said bus-bars.

14. In condenser construction, in combination, a container having therein a gaseous dielectric under pressure, a condenser therein made up of alternated metal foil plates and uncalendered paper, and means enclosing said condenser and including a permeable layer of metal whereby the gaseous dielectric enters into coaction with the paper.

15. In condenser construction, in combination, a plurality of bus-bars extending parallel to each other but spaced about a circle at equal distances, and a plurality of condenser units having means for making electrical connection to said bus-bars, said means being spaced about a circle concentric with said first-mentioned circle and along arcs equal to the arcs of spacing of said bus-bars.

16. In condenser construction, in combination, a casing, a plurality of condenser units, each having an opening therethrough and each having outer dimensions less than the inner dimensions of said casing, means supporting said units within said casing with their openings substantially alined, thereby to form an inner channel, and with their outer portions spaced from the inside walls of said casing, thereby to form an outer channel, said channels communicating at their respective ends, a plurality of bus-bars insulatingly and spacedly supported within and extending along said inner channel, conductive means for electrically connecting condenser units to said bus-bars, said bus-bars being in the aggregate of sufficiently less cross-sectional area than the cross-sectional area of said inner channel as to achieve substantially unimpeded flow of dielectric medium through the channel, and a dielectric heat-abstracting medium within said casing and adapted to circulate within said channels.

17. In condenser construction, in combination, a casing, a rod supported therein and a plurality of condenser units having plate elements therein, each unit having an opening therethrough of greater cross-section than the cross-section of said rod and said units being strung onto said rod, at least certain of said units having means coacting with the openings therein and with said rod for properly spacing the walls of said openings from said rod.

18. In condenser construction, in combination, a casing, a rod supported therein and a plurality of condenser units having plate elements therein, each unit having an opening therethrough of greater cross-section than the cross-section of said rod and said units being strung onto said rod, at least certain of said units having apertured insulating means coacting with the openings therein and with said rod for properly spacing the walls of the openings from said rod, and a conductor passing through apertures in said insulating means and supported by the latter, and means whereby said plate elements of said units are electrically connected to said conductor.

19. In condenser construction, in combination, a casing, a rod supported therein and a plurality of condenser units having plate elements therein, each unit having an opening therethrough of greater cross-section than the cross-section of said rod and said units being strung onto said rod, at least certain of said units having apertured insulating means coacting with the openings therein and with said rod for properly spacing the walls of the openings from said rod, and a plurality of conductors extending lengthwise of said rod but spaced therefrom and from the walls of said openings of said units, said conductors passing through the apertures in said insulating means, and means making electrical connection between plate elements of said units and said conductors.

20. In condenser construction, in combination, a plurality of bus-bars spaced from each other and grouped about an axis and extending substantially parallel to each other, a plurality of condenser units extending along said axis and having means for making electrical connection to said bus-bars, said means being grouped about said axis and spaced commensurately with the spacing of said bus-bars, whereby the connecting means of any one unit is related to the desired bus-bar.

21. In condenser construction, in combination, a casing having a bottom member and a closure member opposite to said bottom member, insulating terminal means carried by said closure member, supporting means supported by said closure member and having a length sufficient to engage said bottom member, capacitor means supported by said supporting means and electrically connected to said terminal means, whereby, upon assembly of said closure member to said casing, said capacitor means and supporting means are carried into said casing, means mechanically interrelating said closure member to said casing, and means whereby the inner end of said supporting means is anchored by said bottom member.

22. In condenser construction, in combination, a casing having a bottom member and a closure member opposite to said bottom member, a rod having means for securing it to and in depending relation from said closure member and being of sufficient length to engage said bottom member, capacitor means extending about said rod, means at opposed ends of said capacitor means for securing the latter to said rod independently of said casing, whereby there is formed a sub-assembly comprising said closure member, said rod, said capacitor means, and said securing means, and whereby, upon assembly of said closure member to said casing, said rod and said capacitor means are carried into the casing, means securing said closure member in place, and means whereby the other end of said rod is anchored to said bottom member.

23. In condenser construction, in combination, a casing having a bottom member and a closure member opposite to said bottom member, said bottom member having an aperture therein, a rod supported by said closure member, and capacitor means, means securing said capacitor means to said rod whereby said capacitor means is directly supported by said rod, thereby forming a sub-assembly comprising said closure member, said rod, said capacitor means and said securing means, whereby, upon assembly of said closure member to said casing, said rod and capacitor means are carried into said casing, the end of said rod opposite from said closure member being received in said aperture.

24. In condenser construction, in combination, a substantially cylindrical casing having a bottom member and a closure member, said bottom member having a substantially centrally positioned aperture, a rod centrally supported by said closure member and adapted to extend along the axis of said casing, capacitor means, means securing said capacitor means to said rod whereby said capacitor means is supported by said rod independently of said casing, whereby, upon assembly of said closure member to said casing, said rod and capacitor means are carried into the casing, the end of said rod remote from said closure member being received in said aperture, and means securing said closure member in place.

25. In condenser construction, in combination, a substantially cylindrical casing having a bottom member and a closure member, said closure member having a flanged portion interfitted with the wall portions of said casing, a rod centrally supported by said closure means and adapted to extend substantially along the axis of said casing, capacitor means, means securing said capacitor means to said rod whereby said capacitor means is supported by said rod independently of said casing whereby said capacitor means is receivable into said casing when said rod enters the latter upon assembly of said closure member to said casing, and means hermetically sealing the junction of said flanged portion of said closure member and the end portion of said casing.

26. In condenser construction, in combination, a casing having a bottom member and a closure member opposite to said bottom member, a central supporting structure extending from said bottom member to said closure member, capacitor means extending about said supporting structure and lengthwise thereof, means securing said central supporting structure at its respective ends to said bottom member and said closure member, and means within said casing and engaging the respective ends of said capacitor means for supporting the latter at its respective ends from and for securing it to said supporting structure.

27. In condenser construction, in combination, a substantially cylindrical casing having a bottom member and a closure member, said bottom member having a substantially centrally positioned aperture, a rod structure extending substantially along the axis of said casing and supported at one end by said closure member and seated at its other end in the aperture in said bottom member, capacitor means within said casing and extending along said rod structure, a pair of members spaced along said rod structure and each engaging an end of said capacitor means for supporting the latter from said rod structure, and means within said casing and operating through said rod structure for drawing one of said members toward the other, thereby to clamp said capacitor means therebetween.

28. In condenser construction, in combination, a casing having a bottom member and a top member, a central supporting structure mounted within said casing and extending from one of said members toward the other, capacitor means extending about said supporting structure and having a substantially centrally positioned opening for the passage therethrough of said supporting structure, a supporting member anchored to said supporting structure adjacent one end of the latter and having portions extending into engagement with one end of said capacitor means, a supporting member slidably mounted upon said supporting structure adjacent the other end thereof and having portions extending into engagement with the other end of said capacitor means, and means coacting with said supporting structure and said second-mentioned supporting member for fixing the position of the latter on the former and thereby cause said two supporting members to grip said capacitor means therebetween.

29. In condenser construction, in combination, a casing having a bottom member and a closure member opposite to said bottom member, a rod structure extending from said closure member and toward said bottom member, said rod structure having a threaded portion adjacent an end thereof, capacitor means within said casing and extending about said rod structure and having an aperture through which the latter passes, a pair of supporting members carried by said rod structure and spaced lengthwise thereof, each engaging an end of said capacitor means, means anchoring one of said supporting members to said rod structure, and means in threaded connection with the threaded portion of said rod structure and operating upon the other of said supporting members to draw the latter toward each other and thereby clamp said capacitor means therebetween.

30. In condenser construction, in combination, a casing having a bottom member and a closure member opposite to said bottom member, a rod structure extending from said closure member and toward said bottom member, said bottom member having an aperture therein, said rod structure having a threaded portion adjacent an end thereof, capacitor means within said casing and extending about said rod structure and having an aperture through which the latter passes, a pair of supporting members carried by said rod structure and spaced lengthwise thereof, each engaging an end of said capacitor means, means anchoring one of said supporting members to said rod structure, means in threaded connection with the threaded portion of said rod structure and operating upon the other of said supporting members to draw the latter toward each other and thereby clamp said capacitor means therebetween, an end of said rod structure being received in the aperture in said bottom member, and means anchoring said rod structure to said bottom member.

31. In condenser construction, in combination, a casing having a bottom member and a closure member, a plurality of annular condenser units, means holding said units in substantial axial alinement, said means extending through the central openings in said units and said means being secured to and depending from said closure member, a plurality of bus-bars extending lengthwise of said units and supported in depending relation with respect to said closure member, and means electrically connecting said units and said bus-bars.

32. In condenser construction, in combination, a casing having a bottom member and a closure member, a plurality of annular condenser units, means holding said units in substantial axial alinement, said means extending through the central openings in said units and said means being secured to and depending from said closure member, insulating terminal means carried by said closure member, a plurality of bus-bars extending lengthwise of said units and supported in depending relation with respect to said closure member, and means electrically connecting said units and said bus-bars, said terminal means being in electrical connection with said bus-bars.

33. In condenser construction, in combination, a casing having a bottom member and a closure member opposed thereto, capacitor means within said casing comprising a plurality of annular condenser units, each made up of alternate foils and strips of insulation spirally wound and said units being coaxially arranged, a rod structure extending through said units and anchored to the bottom and closure members of said casing, and means engaging opposed ends of said capacitor means and spaced along said rod structure for supporting the former from the latter.

34. In condenser construction, in combination, a casing having therein a plurality of coaxial annular condenser units, each made up of alternate foils and strips of insulation spirally wound, and means supporting said units coaxially, said means including a rod structure that is of lesser cross-sectional area than the cross-sectional area of the apertures in said annular units, thereby to provide a space therebetween, and that extends through said units and is supported at its ends by opposed wall portions of said casing and means supported by said rod structure and engaging said units for preventing relative displacement therebetween, said last-mentioned means having spaced parts the spaces between which form continuations of said passage.

35. In condenser construction, in combination, a plurality of condenser units having plate electrodes and each having an opening therethrough and having conductive end elements, each in electrical connection with a plate electrode of the unit and adapted when said units are stacked one upon the other, to connect the latter in series, means coacting with adjacent conductive end elements for holding said units with the openings therein substantially alined, thereby to form a substantially continuous passage, means supporting said stacked units with said passage formed by said alined openings extending substantially vertically and engaging said stack of units without closing off said passage, and means for making electrical connection to end elements of certain of said units.

36. In condenser construction, in combination, a plurality of condenser units having plate electrodes and each having an opening therethrough and having conductive end elements, each in electrical connection with a plate electrode of the unit and adapted, when said units are stacked one upon the other, to connect the latter in series, means coacting with adjacent conductive end elements for holding said units with the openings therein substantially alined, thereby to form a substantially continuous passage, means supporting said stacked units with said passage formed by said alined openings extending substantially vertically and engaging said stack of units without closing off said passage, and a plurality of conductors insulated from each other and extending through said passage but being of an aggregate cross-sectional area less than that of said passage, and means for electrically connecting end elements of said units to said conductors.

37. In condenser construction, in combination, a plurality of condenser units having plate electrodes and each having an opening therethrough and having conductive end elements, each in electrical connection with a plate electrode of the unit and adapted, when said units are stacked one upon the other, to connect the latter in series, means coacting with adjacent conductive end elements for holding said units with the openings therein substantially alined, thereby to form a substantially continuous passage, and means for supporting said stack of units with said passage extending substantially vertically, said supporting means comprising a frame-like metallic member having an aperture therethrough and provided with supporting arms, said frame member being underneath said stack of units, and an apertured insulating member interposed between said frame member and the lowermost condenser unit, the apertures in said frame member and said insulating member forming downward extensions of said passage.

38. In condenser construction, in combination, a plurality of annular condenser units, each made of alternate foils and strips of insulation spirally wound and being stacked one upon the other with the substantially central openings thereof in alinement thereby to form a substantially continuous passage through said stack, means holding said units against relative displacement in a direction transversely to said passage and comprising a plurality of devices for each adjacent two condenser units, said devices coacting with adjacent end portions of adjacent condenser units, a plurality of bus-bars extending lengthwise of said units, and means for electrically connecting said units and said bus-bars.

39. In condenser construction, in combination, a plurality of annular condenser units, each made of alternate foils and strips of insulation spirally wound and being stacked one upon the other with the substantially central openings thereof in alinement thereby to form a substantially continuous passage through said stack, means holding said units against relative displacement in a direction transversely to said passage and comprising a plurality of devices for each adjacent two condenser units, said devices coacting with adjacent end portions of adjacent condenser units, apertured means underneath the lowermost condenser unit for supporting said stack with said passage substantially vertical and for receiving the weight of said stack, the aperture in said means forming a downward open continuation of said passage, and means for making electrical connection to said condenser units.

40. In condenser construction, in combination, a plurality of annular condenser units, each made of alternate foils and strips of insulation spirally wound and being stacked one upon the other with the substantially central openings thereof in alinement thereby to form a substantially continuous passage through said stack, means holding said units against relative displacement in a direction transversely to said passage and comprising a plurality of devices for each adjacent two condenser units, said devices coacting with adjacent end portions of adjacent condenser units, said units each having two angularly spaced means for making electrical connection to the foils therein, said plurality of devices between adjacent units being equiangularly spaced whereby, upon stacking of said units, the electrical connection means of the different units may be alined in the direction of the axis of said stack, and bus-bars interconnecting alined electrical connection means.

41. In condenser construction, in combination, a plurality of annular condenser units, each made of alternate foils and strips of insulation spirally wound and being stacked one upon the other with the substantially central openings thereof in alinement thereby to form a substantially continuous passage through said stack, means holding said units against relative displacement in a direction transversely to said passage and comprising a plurality of devices for each adjacent two condenser units, said devices coacting with adjacent end portions of adjacent condenser units, said units each having two angularly spaced means exposed to said passage for making electrical connection to the foils therein, said plurality of devices between adjacent units being equiangularly spaced whereby, upon stacking of said units, the electrical connection means of the different units may be alined in the direction of the axis of said stack, and bus-bars extending along said passage and interconnecting alined electrical connection means.

42. In condenser construction, in combination, a plurality of condenser units vertically positioned so that an upper one is supported by a lower one through adjacent faces, said adjacent faces being substantially frustro-conical in shape so that said adjacent faces contact only at the central portions thereof.

43. In condenser construction, in combination, a plurality of alined condenser units, means holding said condenser units in position, each of said units having a central opening therethrough and having a supporting casing which includes a sleeve-like member and end plates attached to said sleeve-like member, one end plate of each of said units contacting an end plate of another of said units for supporting purposes, said contact being adjacent the ends of the sleeve-like members to which said end plates are attached.

FRANKLIN S. SMITH.